April 28, 1970  R. R. PITTMAN  3,509,536
ELECTRO-OPTICAL SCANNER AND METHOD FOR INTERPRETING
TRACE-DATA SECTIONS
Filed Feb. 2, 1968  3 Sheets-Sheet 1

INVENTOR.
Robert R. Pittman
BY
Ralph R. Pittman Agt.

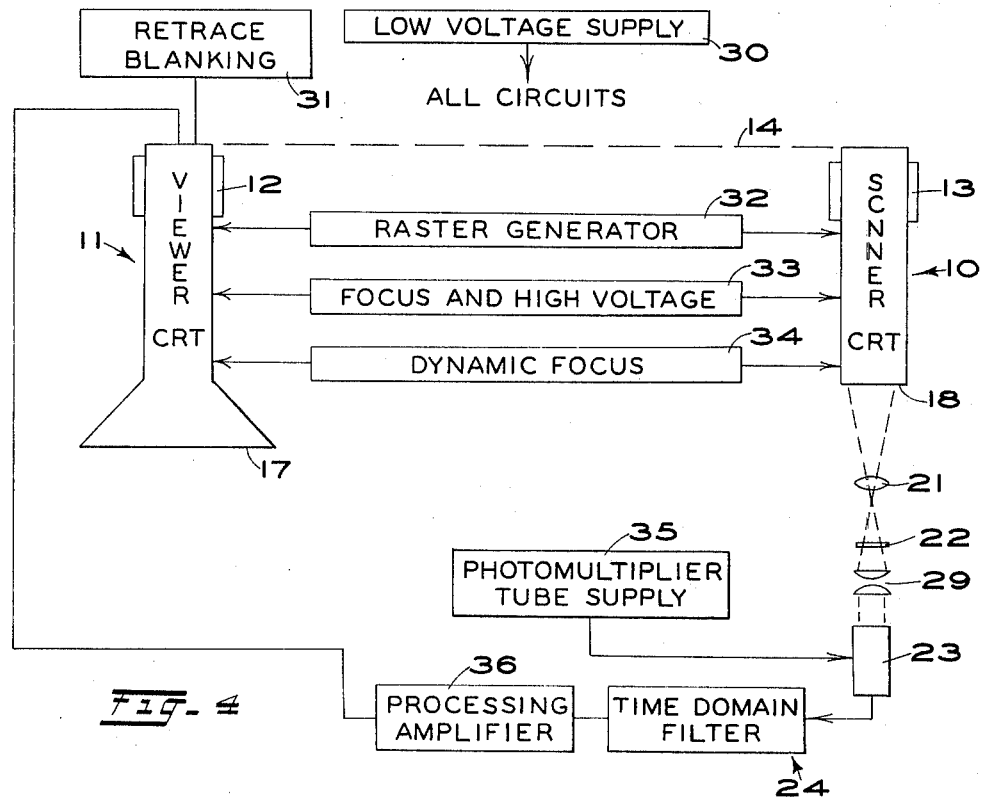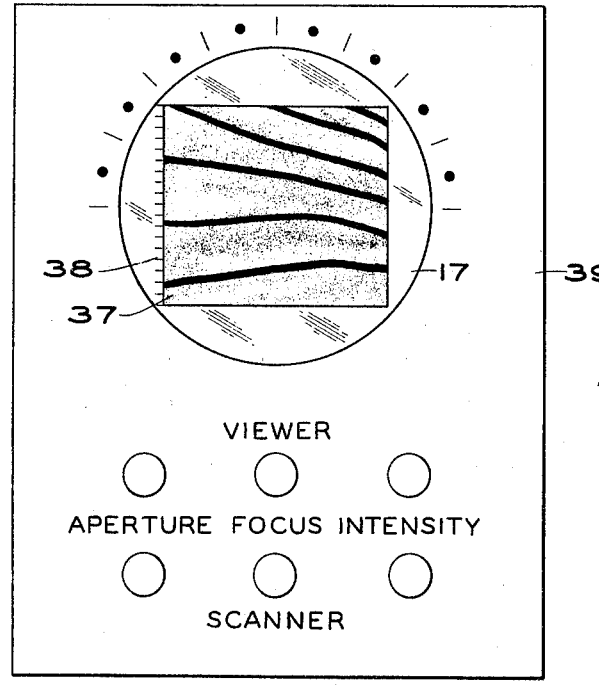

INVENTOR.
Robert R. Pittman

United States Patent Office 3,509,536
Patented Apr. 28, 1970

3,509,536
ELECTRO-OPTICAL SCANNER AND METHOD FOR INTERPRETING TRACE-DATA SECTIONS
Robert R. Pittman, 3929 Amherst St., Dallas, Tex. 75225
Filed Feb. 2, 1968, Ser. No. 702,616
Int. Cl. G01v 1/16
U.S. Cl. 340—15.5                    14 Claims

ABSTRACT OF THE DISCLOSURE

A data scanner, particularly adapted for the interpretive analysis of the data traces as they have been recorded on a seismic section, utilizes a scan drive across a data bearing transparency from a flying spot cathode ray scanner rotatably coupled to a cathode ray viewer, along with time domain filtering applied on a conventional trace by trace basis, enabling time calibration of the filter via timing marks on the section, summation and filtering of adjacent traces at scanning angles other than vertical, and instant visual comparison of the filtered data with the same data on a time invariant basis, all while the section is continuously displayed in upright position.

---

This invention relates generally to cathode ray tube scanning of trace-data sections, and more particularly to apparatus for the interpretive analysis of parallel-trace section transparencies of which one example is a seismic section resulting from seismology explorations.

More specifically, the invention concerns apparatus embodying cathode ray scanning and viewing tubes which electro-optically cooperate to concurrently modify and exhibit a plurality of variable electrical signals on the fluorescent screen of the viewing tube. A number of investigative procedures employ vibration-type signals, in which the signals are converted to electrical signals by transducers and recorded for interpretive analysis, among them being medical and aerodynamical activities, in addition to geological work to which the present invention is particularly directed and in which connection it will be described.

Petroleum seismology involves the generation of ground vibrations, either by subsurface dynamite explosions or some sort of surface disturbance, along with detection of the vibrations at a plurality of geophones spaced from the source and from one another. A large amount of the vibratory energy reaching the geophones is spurious in character and generally called "noise," while a relatively small amount of energy actuating the geophones represents useful information. As presently practiced, magnetic geophone recordings obtained from the field are taken to a laboratory for analysis and clarification. Each geophone trace usually has (a) geometrical corrections applied to relate all detection points to a common horizon, (b) some operations performed thereon to improve the "signal to noise ratio" and (c) grouping with other sections by photographic procedures.

The resulting record sections frequently consist of hundreds of physically adjacent geophone traces all placed on the same time axis. Each trace appears as a relatively long, thin line or bar, the darkness or density of which is dependent upon the signal amplitude at any instant of time. Such a section is known as a variable density record section. A typical record section might represent four seconds of time and appear on photographic paper about one yard square. Another common type of record section is composed of variable area traces, the width of the trace varying in accordance with the signal amplitude. An assembled record section represents a view of the earth subsurface strata, and for analysis by the apparatus of the present invention is photographically reduced to a 35 millimeter fine grain film transparency.

An object of the present invention is the provision of apparatus for displaying the seismic-section geophone signals in visual form so that the wave forms from which they originated can be continuously examined while various techniques are selectively employed for the purpose of facilitating the distinguishment between valuable information and spurious noise.

Another object is the provision of means for applying time domain filtering on a conventional trace-by-trace basis so that the effect of such filtering can be seen instantly and over the entire section.

A further object is the provision of means for calibrating the filter through the use of timing marks on the transparency section.

Another object is the provision of means for summing adjacent traces appearing on the transparency.

Another object is the provision of apparatus enabling scanning of the seismic section at various selected angles other than vertical while the displayed section remains in upright position.

Another object is the provision of means for modifying the electrical signals between scanner and viewer so as to alter the appearance of the displayed section, by concurrently employing two or more of the foregoing operations.

An additional object is to provide new and valuable techniques not presently available for the interpretive analysis of the trace data of seismic sections.

In the drawings:

FIG. 1 is an abbreviated block diagram of the apparatus of the invention;

FIG. 2 fragmentarily shows the screens of the scanner and viewer, in which the scanning lines of the scanner have been widened;

FIG. 4 is a somewhat more complete block diagram of the apparatus of the invention;

FIG. 5 is an elevational view of the viewing tube screen and housing, in which a seismic section is shown displayed in one possible presentation;

In summary, the invention includes a scanning cathode ray tube, a viewing cathode ray tube, and a photographic transparency reduction of the seismic section to be examined, in a configuration known as a flying spot scanner. The tubes are mechanically connected for coincidental rotation about their respective longitudinal axes. The writing spots of both tubes are synchronously swept at one speed along one direction across their screens and at a relatively lower speed along another direction normal to that of the first-stated direction. The intensity of the writing spot of the scanner is normally held constant and focused by optical means on the section transparency, which is typically a 35 millimeter photographic film.

As the writing spot of the scanner traverses its screen, its image also traverses the film transparency, and the light transmitted through any point on the transparency will be directly proportional to the density of the transparency at that point. The transmitted imaged writing spot will thereby be modulated by the density variations, or degree of transparency, of the section. The modulated light variations thus derived are sensed by a photomultiplier tube which translates the light variations into proportional electrical signals, and by channeling these electrical signals to control the writing spot intensity of the viewing tube, a replica of the section transparency will appear on the screen of the viewing tube.

The invention herein includes the apparatus and methods for modifying the electrical signals en route to the viewing tube so as to alter the appearance of the replica appearing thereon in a useful manner, as will now be described in more detail.

Figure 1:
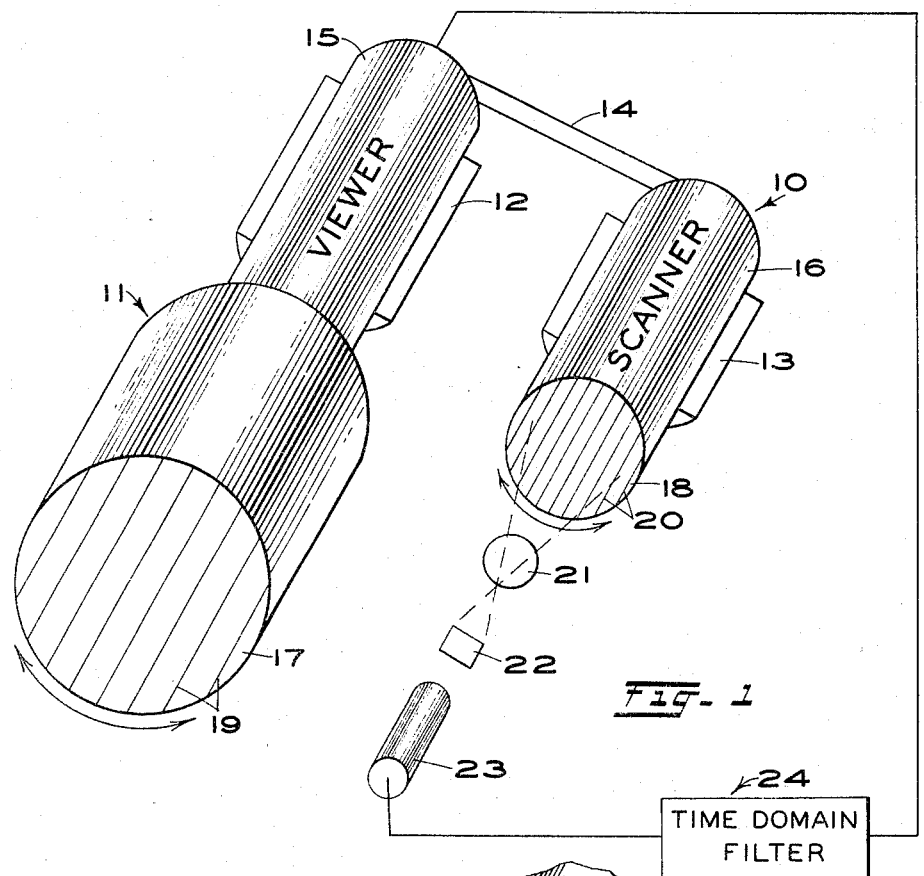

Referring first to the block diagram of FIG. 1, the writing spots of the high resolution cathode ray scanner tube 10 and the cathode ray viewer tube 11 are shown synchronously scanning their respective screens 18 and 17, their paths defining a series of substantially parallel rectilinear lines 19 and 20, respectively. Suitable cathode ray tubes for use in the invention are Cat. Nos. SC2782P37 and SC3890P40, as manufactured by Sylvania Electric Products, Seneca Falls, N.Y., the latter number identifying a display tube having about a ten inch optically flat face and a high level of brilliance. Although only a few lines are shown for convenience in representation, it is common to employ over a thousand of these lines. The writing spot of the scanner tube is focused on the 35 mm. section transparency 22 by the objective lens 21 and the transparency is traversed by the series of scanning lines. A suitable objective lens is an Oscilloparagon as manufactured by Ilex Optical Co., Rochester, N.Y. In the view shown, the lines may be colinear with each of the geophone traces on the seismic section; that is, a scanning line starts at the beginning of the first geophone trace and travels along its path before proceeding to the beginning of the adjacent trace, and in this way each trace will modulate the light transmitted in accordance with the density at any point of the trace.

The light variations are sensed by the energized photomultiplier tube 23, which translates them into proportional electrical signal variations. The power supply to the photomultiplier tube, indicated by 35 of FIG. 4, may be similar to model 1043, available from Litton Industries, San Carlos, Cal., and the tube itself similar to type 6292 of A. B. Dumont Laboratories, Clifton, N.J. The electrical signal variations are passed through the time domain filter 24 and may be modified thereby, and are then channeled to the beam intensity controlling element of the viewer tube 11.

Since the writing spots of both tubes are synchronized, a replica of the seismic section as modified by the time domain filter 24 will appear on the screen 17 of the viewer tube 11. FIG. 5 generally illustrates a representative view of a displayed seismic section 37 as so developed, here shown on the screen 17 of the viewer 11 in a housing 39. The displayed section, although constituted from a large number of adjacent modulated lines, appears as a continuous record.

Figure 2:
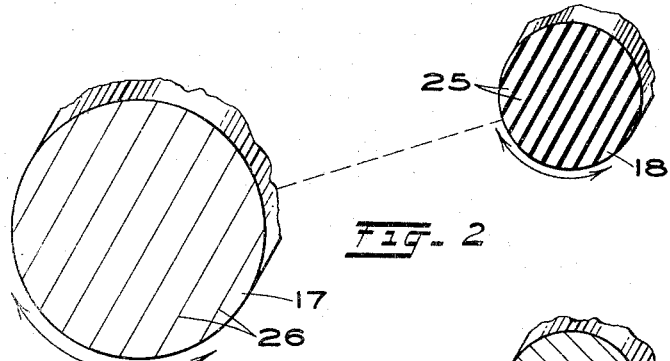

Referring now to FIG. 2, it may be noted that the scanning lines of the scanner have been widened as indicated at 25. If the imaged width of a scanning line is as wide as two seismic traces, the light transmitted to the photomultiplier tube will depend upon the average density of both traces although such "averaged" information may be written by the unmodified contemporaneous scanning line on the viewing tube, as shown at 26. The width of the scanning line may be increased so that a number of traces can be simultaneously averaged, and the averaging process is important in section examination for the reason that it can indicate the presence of comprehensible or "coherent" information as contrasted with random "noise."

Figure 6:
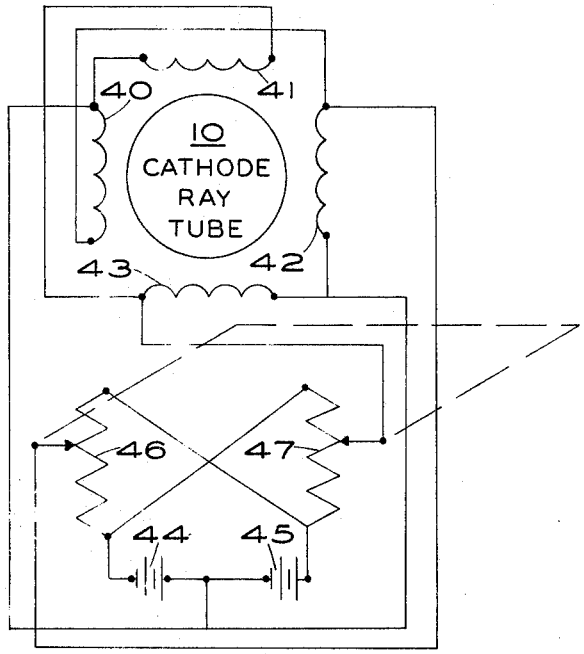
FIG. 6 is a schematic diagram of the electronic lens of the invention.

FIG. 6 shows a diagram of the electron lens which is effective for changing the scanning aperture from a small dot to either a vertical or horizontal line of variable width. This technique is sometimes referred to as magnetic astigmatic control, and is familiar to skilled workers in this art. The system includes a quadrature disposition of the induction coils 40, 41, 42, and 43 about the axis of the electron beam of the cathode ray tube. A suitable magnetic lens is the FC-5 Focus Coil, available from Ferranti Electric, Plainview, Long Island, N.Y. The influence of the magnetic lens is adjusted by varying the magnitude and direction of current in each of the coils as supplied from the batteries 44 and 45 via the adjustable resistors 46 and 47.

Figure 3:
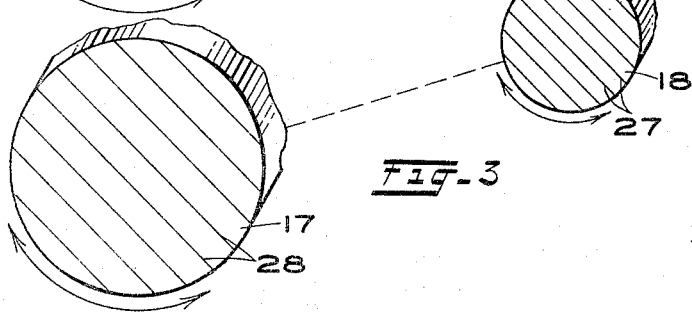
FIG. 3 is a similar view, in which the scanning lines are shown with the tubes rotated to a differing angular position.

Referring now to FIG. 3, the scanning lines are shown with the tubes in a rotated position, as indicated by the numerals 27 and 28. In apparatus according to the invention, both tube assemblies including their shields 15 and 16 and associated beam controlling components are rotatively mounted, as indicated in FIG. 1, in the pillow blocks 12 and 13, for rotation about their respective longitudinal axes, and mechanically coupled, as indicated at the numeral 14, so that rotation of one assembly will cause coincidental and equal rotation of the other in the same direction. This construction enables the scanning lines to traverse the seismic section in an infinite number of directions, while the record section as seen on the viewing screen 17 does not appear to change its position, due to the inverting effect of the focusing lens. A convenient construction is one in which the viewing tube may be rotated at the front panel, thus correspondingly turning the scanner. Each scanning line as indicated in FIG. 3 does not traverse the section in a colinear, or trace-by-trace scan, but may travel across a number of traces before proceeding to the next writing line. This feature is valuable because an analyst may inspect the seismic section from any direction, and concurrently use the aperture control as desired to "average" information. In addition, trace data may be selectively and concurrently filtered in differing scanning directions through the use of the associated time domain filter.

Figure 7:
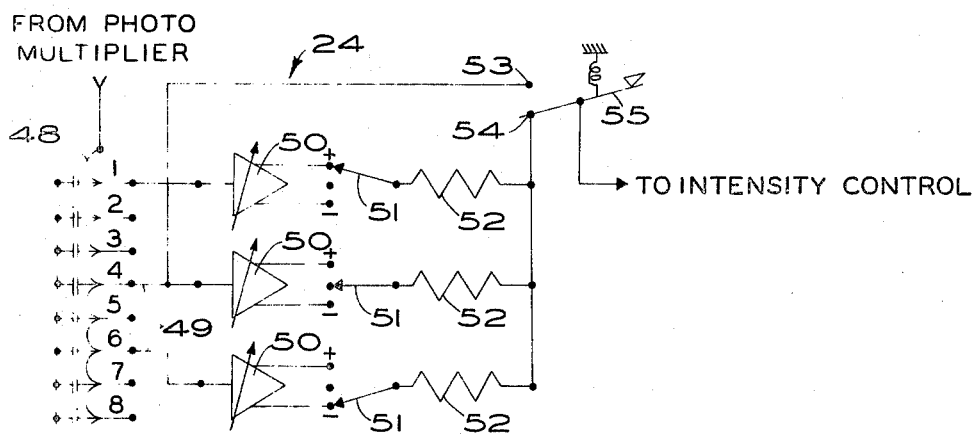
FIG. 7 is a schematic diagram of the time domain filter.

The time domain filter 24, diagrammed in FIG. 7, is an important component of the present invention, and includes a multiple-tapped delay line 48 and a plurality of identical variable gain bipolar amplifiers 50. The construction of the delay line is well known, and a suitable delay line is available from Kenyon Transformer Co., Jersey City, N.J., and the amplifiers 50 are similar to the type FSL-4 amplifiers as manufactured by Nexus Laboratories, Canton, Mass. In operation as combined with the complete apparatus, signal variations, as sensed by the photomultiplier 23, are channelled into the delay line. The signals will appear sequentially along the taps of the delay line, and thence directed through the jumpers 49 to the amplifiers 50, the outputs of which may be selected by means of the switches 51 before passing into the summing network of the resistors 52. Selectively variable filtering characteristics are effected by jumping between taps on the delay line and amplifiers, and adjusting the gain controls of the amplifiers.

An important use of the time domain filter of the invention is the facility of obtaining a zero phase or time invariant characteristic. This is accomplished through the use of the switch 55, which normally directs the filtered data to the intensity control elements of the viewing tube through the contact 54. By depressing the switch 55 to transfer the intensity control channel to the contact 53, all filter points are disconnected except that at the midpoint of the delay line. All leading and lagging operations about this point being identical, this action will modify the frequency content of the data but leave all events time-invariant with respect to each other. When interpreting the trace data of a seismic section, it is often advantageous to instantly refer back to the unfiltered data for comparative purposes, and such reference is made readily available in the system here described.

Another useful feature of the time domain filter is the readiness with which it can be calibrated in terms of time graduations on the record section. One set of such graduations is shown at the numeral 38 of FIG. 5; it is common to have time marks at 0.1 second intervals on seismic record sections. By scanning the section in a colinear, trace-at-a-time manner, two points on the delay line may be selected which will yield two images 0.1 record apart as measured by the timing marks. If all taps are equally spaced in time, and the number of tap intervals equal to an apparent known value of section time is determined, then the time value of each tap in terms of record time may be calculated. It is noted that only a few taps and amplifiers are shown in the time domain filter illustrated; in practice a much larger number will be found desirable.

The block diagram of FIG. 4 is shown to present the system in somewhat greater detail as to its components, many of which, from their designation, will be immediately seen to be well known. As in common practice, all circuits are supplied at utilization voltage, as indicated at the reference character 30. A satisfactory apparatus constructed in accordance with the disclosure herein requires about 250 watts at 115 volts, 60 c.p.s. The condensing lens 29 is that commonly used in photographic enlargers. The raster generators 32, focus and high voltage supply 33 and the video processing amplifier 36 are respectively model 1015, model PS–105 and 1026, all referring to model numbers of Litton Industries, San Carlos, Cal., and the retrace blanking 31 and the dynamic focus control 34 may be similar to the items so designated as offered by Beta Instrument Co., Newton Upper Falls, Mass.

It is believed that the above-described block diagrams, taken in connection with the specific identification of the critical components of the system, will enable any routine worker in electronics to practice the invention in accordance with the best mode herein disclosed. A convenient arrangement of the apparatus is to assemble the system in two separate units, cable connected. The display unit, similar to FIG. 5, may house both cathode ray tubes with associated optics and circuitry, while another container may house the several power supplies and the time domain filter components.

The inherent versatility of the system herein described provides the geophysicist with a heretofore unavailable facility for the interpretation of subsurface strata from seismic section transparencies, in that a section may be scanned at any angle, the scanning as well as the display aperture may be adjusted as desired, and the video data may be modified by time domain filtering; all while the entire section remains continuously displayed in the upright-direction.

Various obvious changes and modifications in the embodiment herein described will be readily apparent to those skilled in the art, and such obvious alterations are deemed to fall within the scope and spirit of the invention as set forth in the claims.

What is claimed as new and desired to be secured by Letters Patent of the United States is:

1. The combination with a cathode ray scanning tube, a cathode ray display tube, each of said tubes embodying ray deflection means, and associated generators of electrical waves of differing frequency-series cooperating with the deflection means of said tubes to effect mutual synchronization and coordination of the respective cathode-ray beams of said tubes, of
   a trace-data transparency having thereon a plurality of phonographically reproducible traces of variable light-transmission value,
   means for imaging light from said scanning tube onto said reproducible traces,
   means for translating the transmitted light variations into corresponding electrical signals,
   means for modulating the intensity of the cathode-ray beam of the display tube by said electrical signals, and
   means for mechanically rotating said tubes in synchronism.

2. The apparatus as set forth in claim 1, wherein said tubes are disposed with their respective longitudinal axes in laterally spaced parallel relationship and mechanically coupled for coincidental rotation about said axes.

3. The combination with a cathode ray scanning tube, a cathode ray display tube, each of said tubes embodying ray deflection means, and associated generators of electrical waves of differing frequency-series cooperating with the deflection means of said tubes to effect mutual synchronization and coordination of the respective cathode-ray beams of said tubes, of
   a trace-data transparency having thereon a plurality of phonographically reproducible traces of variable light-transmission value,
   means for imaging light from said scanning tube onto said reproducible traces,
   means for translating the transmitted light variations into corresponding electrical signals,
   means for modulating the intensity of the cathode-ray beam of the display tube by said electrical signals, and
   means for imaging the cathode-ray beams of each tube from a dot to a line.

4. The apparatus as set forth in claim 3, wherein the means for imaging the cathode-ray beams from a dot to a line comprises elements constituting a system of magnetic astigmatic control.

5. The combination with a cathode ray scanning tube, a cathode ray display tube, each of said tubes embodying ray deflection means, and associated generators of electrical waves of differing frequency-series cooperating with the deflection means of said tubes to effect mutual synchronization and coordination of the respective cathode-ray beams of said tubes, of
   a trace-data transparency having thereon a plurality of phonographically reproducible traces of variable light-transmission value,
   means for imaging light from said scanning tube onto said reproducible traces,
   means for translating the transmitted light variations into corresponding electrical signals,
   means for modulating the intensity of the cathode-ray beam of the display tube by said electrical signals, and
   reversible polarity time domain filtering means effective to modify said electrical signals before the intensity-modulating means is effective to modify the cathode-ray beams of said display tube.

6. The combination with a cathode ray scanning tube, a cathode ray display tube, each of said tubes embodying ray deflection means, and associated generators of electrical waves of differing frequency-series cooperating with the deflection means of said tubes to effect mutual synchronization and coordination of the respective cathode-ray beams of said tubes, of
   a trace-data transparency having thereon a plurality of phonographically reproducible traces of variable light-transmission value,
   means for imaging light from said scanning tube onto said reproducible traces,
   means for translating the transmitted light variations into corresponding electrical signals,
   means for modulating the intensity of the cathode-ray beam of the display tube by said electrical signals,
   time domain filtering means effective to modify said electrical signals before the intensity-modulating means is effective to modify the cathode-ray beams of said display tube, and
   switch means operatively connected to render said time domain filtering means ineffective whereby filtered and unfiltered electrical signals may be compared.

7. The combination with a cathode ray scanning tube, a cathode ray display tube, each of said tubes embodying ray deflection means, and associated generators of electrical waves of differing frequency-series cooperating with the deflection means of said tubes to effect mutual synchronization and coordination of the respective cathode-ray beams of said tubes, of
   a trace-data transparency having thereon a plurality of phonographically reproducible traces of variable light-transmission value,
   means for imaging light from said scanning tube onto said reproducible traces, means for translating the transmitted light variations into corresponding electrical signals, means for modulating the intensity of the cathode-ray beam of the display tube by said electrical signals, and time domain filtering means effective to modify said electrical signals before the intensity-modulating means is effective to modify the cathode-ray beams of said display tube, said tubes being disposed with their respective longitudinal axes in transversely spaced parallel relationship and mechanically coupled for synchronous rotation.

8. In an electro-optical method for the interpretive analysis of a seismic trace-data transparency section as displayed on the screen of a cathode ray viewing tube from a scanning by a cooperating optically-connected cathode ray scanning tube, the step comprising optically compositing the adjacent traces of the trace-data by selectively varying the width of the illuminating aperture of the scanning tube.

9. In the second recited in claim 8, the optically compositing procedure including as an additional step a synchronized rotatable scanning of the transparency.

10. In the method as set forth in claim 8, the additional step of modifying the trace-data image by time domain filtering.

11. In an electro-optical method for imaging-analyzing on the screen of a cathode ray viewing tube a time-graduated seismic trace transparency through a time domain filter, the step which includes calibrating said filter by a co-linear, trace-at-a-time scanning of the transparency and observing the image displacement of the timing marks on the transparency, the time domain filtering being accomplished by concurrent synchronized rotary scanning of the transparency.

12. In a method for electro-optically displaying a seismic trace-data transparency on the viewing screen of a cathode ray viewing tube, the improvement which comprises electrically modifying the trace-data image by time domain filtering and selectively comparing the filtered trace-data image with the unfiltered trace-data image concurrently with synchronized rotary scanning.

13. In an electro-optical method for modifying the image of a seismic trace-data transparency section as displayed on the screen of a cathode ray viewing tube from scanning by an electro-optically connected cathode ray scanning tube, the steps of
 (a) optically compositing the adjacent trace-data traces by selectively varying the width of the illuminating aperture of the scanning tube;
 (b) concurrently accompanying said compositing with a synchronized rotary scan; and
 (c) further concurrently modifying the trace-data image by symmetrical time domain filtering.

14. In the method defined in claim 13, the additional step of further sequentially modifying the trace-data image by alternate symmetrical and asymmetrical time domain filtering.

References Cited

UNITED STATES PATENTS

| | | | |
|---|---|---|---|
| 2,275,735 | 3/1942 | Cloud | 340—15.5 |
| 3,108,248 | 10/1963 | Alexander et al. | 340—15.5 |
| 3,281,776 | 10/1966 | Ruehle | 340—15.5 |

RODNEY D. BENNETT, Jr., Primary Examiner

C. E. WANDS, Assistant Examiner